US005801796A

United States Patent [19]
Lowe

[11] Patent Number: 5,801,796
[45] Date of Patent: Sep. 1, 1998

[54] STACKED PARALLAX-FREE LIQUID CRYSTAL DISPLAY CELL

[75] Inventor: Anthony Cyril Lowe, Braishfield, United Kingdom

[73] Assignee: International Business Machines Corporation, Armonk, N.Y.

[21] Appl. No.: 644,556

[22] Filed: May 10, 1996

[51] Int. Cl.$^6$ .......................... G02F 1/133; G02F 1/1347; G02F 1/1339
[52] U.S. Cl. .................. 349/73; 349/74; 349/78; 349/155
[58] Field of Search .................. 349/73–78, 155

[56] References Cited

U.S. PATENT DOCUMENTS

| | | | |
|---|---|---|---|
| 3,992,082 | 11/1976 | Katz | 349/74 |
| 4,054,368 | 10/1977 | Krueger et al. | 349/74 |
| 4,886,343 | 12/1989 | Johnson | 349/74 |
| 5,113,272 | 5/1992 | Reamey | 249/73 |
| 5,194,973 | 3/1993 | Isogai et al. | 349/74 |
| 5,251,048 | 10/1993 | Doane et al. | 349/88 |

*Primary Examiner*—William L. Sikes
*Assistant Examiner*—Julie Ngo
*Attorney, Agent, or Firm*—Ann Vachon Dougherty; Daniel P. Morris

[57] ABSTRACT

This invention relates to a novel cell construction which enables stacked cells to be formed in which the intermediate substrate is so thin that little or no parallax occurs between the images formed in the two or more cells. In addition, the thickness of the intermediate substrate is such that the field drop across is is low (about 10%) compared to that across the liquid crystal layers, and the stacked cell can be addressed as a single cell. This greatly simplifies and reduces the cost of the interconnections and drive electronics. The avoidance of the need for transparent electrodes on both surfaces of the intermediate substrate also improves transmittance (and reflectivity) of the device. Of course, should it be required, the intermediate substrate can be patterned with transparent electrodes in the conventional way. The advantage of substantially zero parallax would remain.

30 Claims, 5 Drawing Sheets

5,801,796

STACKED PARALLAX-FREE LIQUID CRYSTAL DISPLAY CELL

FIELD OF THE INVENTION

The invention relates to a cell, divided from front to back into two or more separate compartments with minimum separation between the compartments, suitable for use in flat panel displays.

BACKGROUND

The performance of a flat panel liquid crystal display may be inferior to that required if a single display cell is employed. This can be the case for both reflective and transmissive, or backlit, displays. In the case of reflective displays, either the contrast ratio (CR) or the reflectivity (R), or both may be lower than required, or some other property, such as the display operating voltage, may be outside the required range, as the following examples of existing art will show.

EXAMPLE 1

Nematic Guest-Host Display

A nematic Guest-Host display (Heilmeier GH and Zanoni LA, Appl. Phys. Lett., Vol. 13, p 91 (1968)) uses a solution of a dichroic dye (guest) in a nematic liquid crystal (host). The liquid crystal is aligned substantially parallel to the display substrates. The properties of the guest dye molecules are chosen so that they align parallel to the liquid crystal molecules and so that the transition dipole for the absorption of visible light is substantially parallel to the geometric axis (i.e., the alignment direction) of the molecule.

The alignment direction on the upper and lower substrates may be either parallel or, for optimum performance, orthogonal (Lowe AC, Mol. Cryst. Liq. Cryst., Vol. 66, p 295, 1981). The display is viewed through a polarizing film oriented with its transmitting axis parallel to the alignment direction on the upper substrate. Thus the guest-host layer is illuminated only with light of the polarization state which can be absorbed by the guest dye molecules; absorption of light is efficient and the display appears dark. When an electric field is applied across the G-H layer by means of electrodes on the upper and lower substrates, the liquid crystal and therefore also the dye molecules are rotated perpendicular to the plane of the display, in which orientation little light is absorbed by the dye and the display appears light. Contrast ratios in excess of 10:1 can be obtained in such displays. However, the light state reflectivity is greatly reduced by the presence of the polarizer which reduces reflectivity to a practical maximum of about 30%. The operating voltage of such a display is low at about 4 volts for full turn-on.

EXAMPLE 2

Cholesteric Guest-Host Display

This is a development of the nematic guest-host display described in Example 1. By the addition of a chiral material to the guest-host mixture to produce a helical pitch length a few times greater than the wavelength of visible light (White DL and Taylor GN, J. Appl. Phys., Vol. 45, p 4718, (1974)) both polarizations of incident light can be absorbed and a front polarizer is no longer required. This increases the light-state reflectivity. However, the threshold voltage of a chiral system is inversely proportional to the chiral pitch. This has the effect of increasing the threshold by a factor of 4–5 over the nematic G-H described in Example 1. Moreover, the voltage required for complete turn-on of the device is also increased and the absorption of unpolarized light in the field-off state is less efficient than the absorption of polarized light in Example 1, so either contrast ratio or reflectivity must be compromised.

EXAMPLE 3

Cholesteric Texture Effects

These effects make use of the fact that chiral nematic systems reflect light of wavelength, $\lambda$, where $\lambda$ is related to the pitch length, P, and the average refractive index, $n_a$, of the liquid crystal by $\lambda = n_a P/2$. (Crooker et al, U.S. Pat. No. 5,200,845, Doane et al, U.S. Pat. No. 5,453,863, Doane et al, U.S. Pat. No. 5,437,811, West et al, U.S. Pat. No. 5,453,863). However, the liquid crystal layer reflects circularly polarized light such that the electric vector of the reflected light is a mirror image of the chiral helix; i.e., a right-handed helix will reflect only right-handed circular polarized light. Unpolarized light can be considered to be composed of two oppositely-handed circular polarized components. Thus the theoretical limit of the reflectivity of a chiral layer is 50%. In practice, it is less than this—about 40%.

These examples serve to show that an adequate combination of high contrast, high reflectivity and minimum operating voltage cannot be obtained by the known art.

The contrast and/or the reflection performance of displays can be improved by using a stacked structure of two or more cells. Other examples of known art relate to the use of stacked cells (Haim et al U.S. Pat. No. 4,637,687; Crooker et al U.S. Pat. No. 5,200,845). These are formed by stacking separate cells, or by making more complex cells in which an intermediate substrate is shared by both cells, forming the rear surface of the front cell and the front surface of the rear cell. Because such substrates have significant thickness (approx 1 mm), substantial parallax results between the images formed in the two cells when the display is viewed at off-normal angles. This limits the use of such displays to applications where the pixel size is substantially greater than the separation distance between the two cells. Alternatively (Yoshimisu U.S. Pat. No. 5,329,388), a light-guiding film can be used to constrain the angle at which light propagates from one cell to the other to an angle close to the normal to the display surface. The disadvantage of this approach is that the optical efficiency of such films is not high, and reflectivity or transmittance are degraded.

It is an object of the present invention to provide an improved liquid crystal display cell.

It is another object of the present invention to provide an improved liquid crystal display cell which avoids the adverse effects of parallax.

Thus, the known art is unsuitable for applications where high pixel density and high contrast and/or reflectivity performance are simultaneously required, such as in reflective or highly transmissive backlit computer displays.

SUMMARY

This invention relates to a novel cell construction which enables stacked cells to be formed in which the intermediate substrate is so thin that little or no parallax occurs between the images formed in the two or more cells. In addition, the thickness of the intermediate substrate is such that the field drop across it is low (about 10%) compared to that across the liquid crystal layers, and the stacked cell can be addressed as a single cell. This greatly simplifies and reduces the cost of the interconnections and drive electronics. The avoidance of the need for transparent electrodes on both surfaces of the intermediate substrate also improves transmittance (and reflectivity) of the device. Of course, should it be required, the intermediate substrate can be patterned with transparent electrodes in the conventional way. The advantage of substantially zero parallax would remain.

Further objects, features, and advantages of the present invention will become apparent from a consideration of the following detailed description of the invention when read in conjunction with the drawing FIGS., in which:

DESCRIPTION OF DRAWINGS

FIG. 1A shows the cell in the field-off state. The shading in the upper and lower portions of the cell is intended to show the liquid crystal aligned perpendicular to the plane of the page in the upper portion and parallel to the plane of the substrates in the lower portion. FIG. 1B shows the cell in the field-on state, in which all of the liquid crystal material is aligned substantially perpendicular to the plane of the substrates.

FIG. 2 also shows a possible method whereby adhesive 32, 33 is pre-screened around the periphery of 11 and 12 to form an edge seal. This avoids any need to process the thin intermediate substrate 13 other than for liquid crystal alignment.

DETAILED DESCRIPTION

Figure 1A:
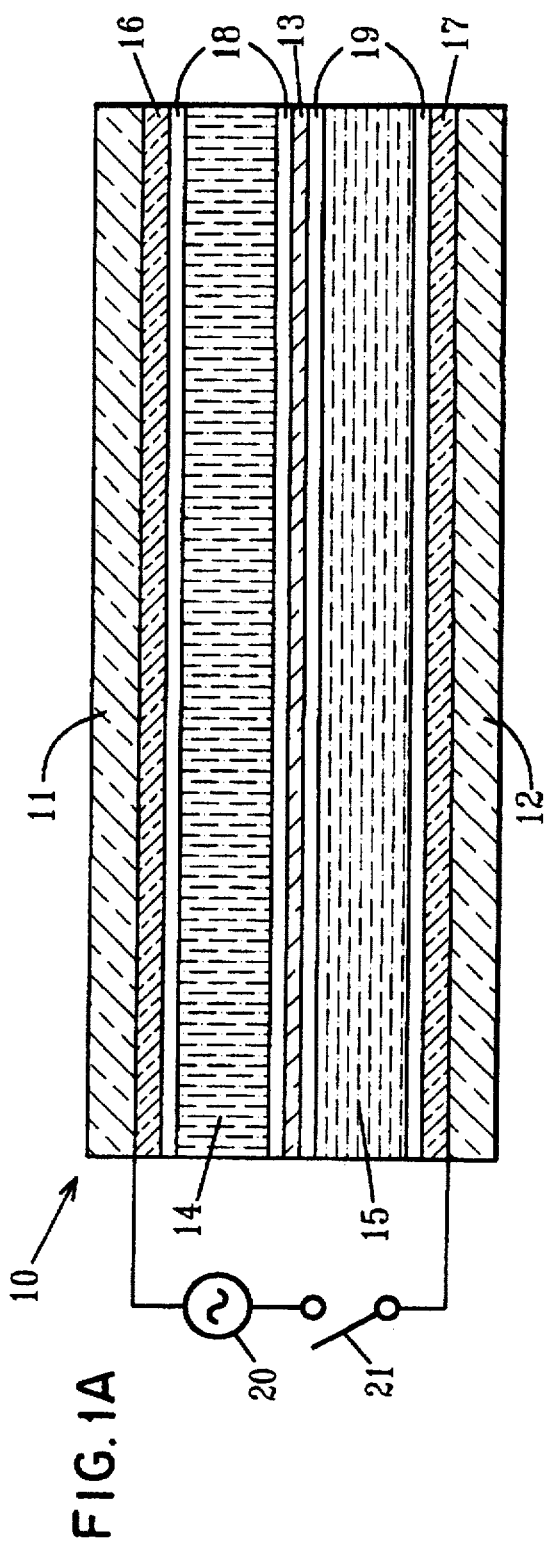
FIG. 1A and 1B show a cross-section of a cell 10 comprising a transparent front substrate 11 and a transparent or opaque rear substrate 12. A very thin intermediate substrate 13 is supported between substrates 11 and 12, forming two compartments 14 and 15, which are filled with liquid crystal material. Substrate 11 is coated with a transparent electrically conducting material 16 on its inner surface. Substrate 12 is coated with a plurality of electrodes 17 made from a transparent or an opaque electrically conducting material on its inner surface. The opaque conducting material can be reflective or light absorbing. The surfaces of 16, 17 and 13 which are exposed to the liquid crystal may be coated with an aligning material and rubbed or treated in some other way known in the art to promote alignment of the liquid crystal. The alignment layers 18 in the upper portion of the cell may or may not be different from the alignment layers 19 in the lower portion. An electrical field may be applied between the layers 16 and 17 by means of an external source 20 and a switch 21.
Figure 1B:
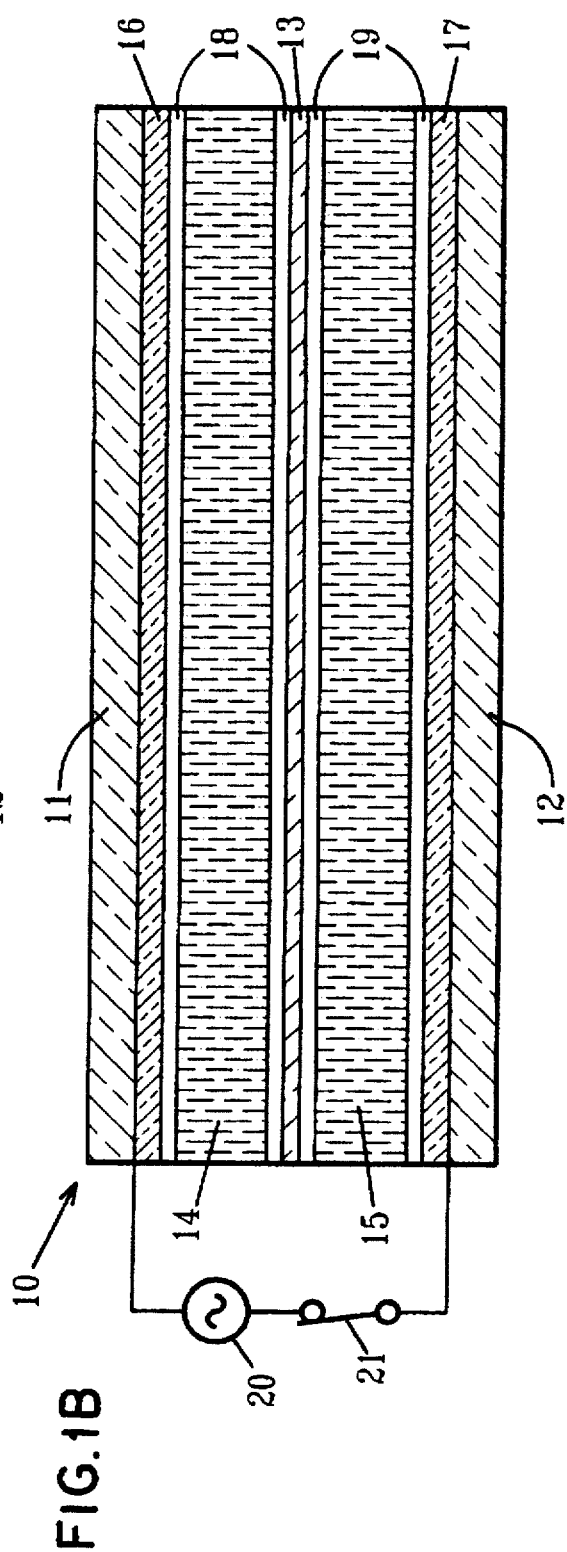

FIG. 1 shows a cross section view of a duplex liquid crystal cell 10 in which a transparent front substrate 11 and a transparent or opaque rear substrate 12 are separated by and spaced apart from a transparent intermediate substrate or membrane 13. The inner surface of substrate 11 is coated with a transparent electrode material 16 e.g., indium-tin oxide (ITO). The inner surface of the rear substrate is coated with an electrode material 17 which can be transparent or opaque, reflective or light absorbing, depending on the particular liquid crystal effect employed. This invention relates to a novel cell structure and the means for making it. It can be used with several different liquid crystal effects and therefore with several different addressing schemes. For example, when using a monostable liquid crystal effect in a high resolution display, the pixels will be addressed by an active matrix in which each pixel is driven via an integrated circuit switch, which can be a transistor, a diode or a metal/insulator/metal (MIM) device. In all such cases, the conductor 17 will be etched into a multiplicity of electrodes, one for each pixel. In the case of TFT-driven display, the electrode 16 will be a continuous sheet and in the case of diodes and MIMs it will be etched into strips, one for each column of the display.

Figure 2:
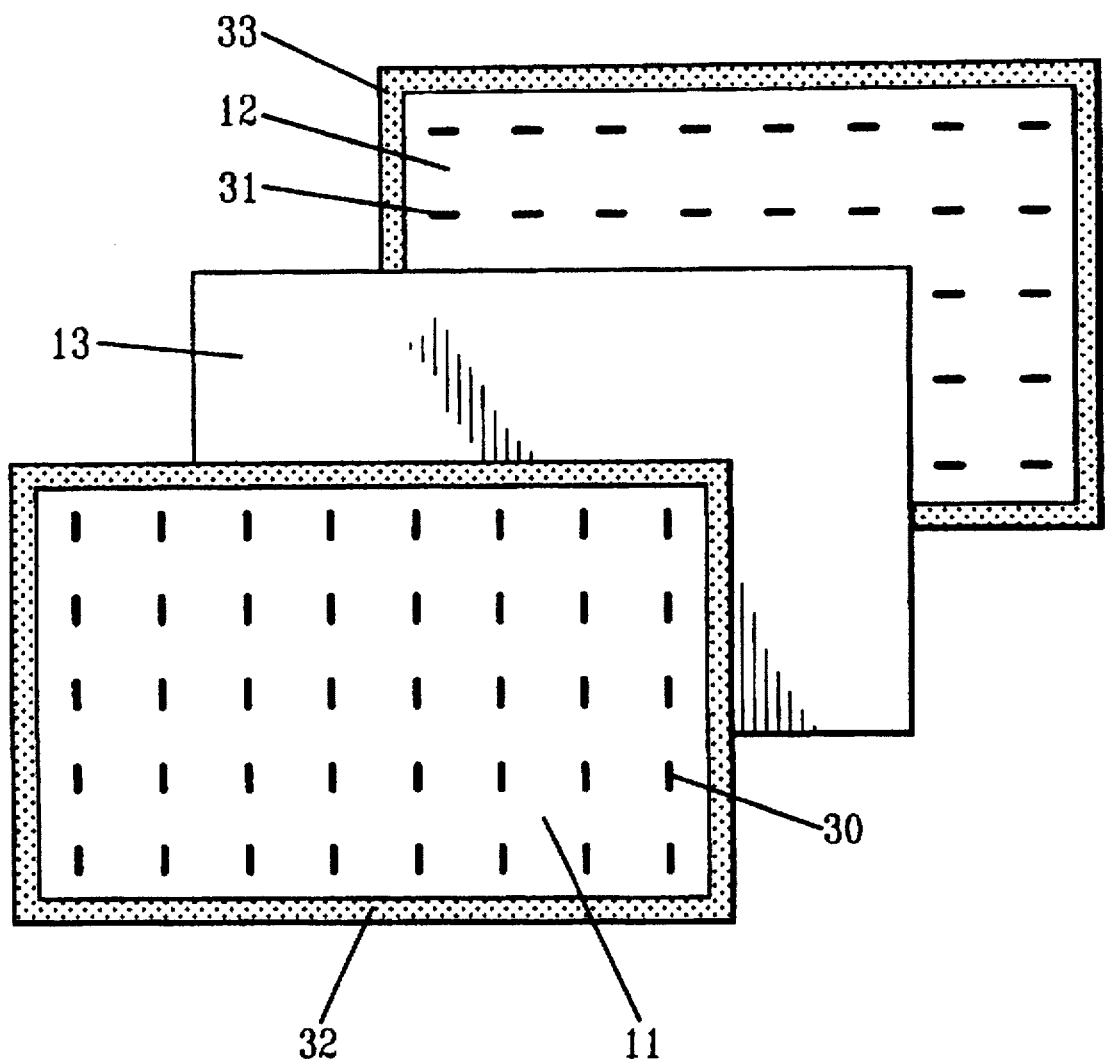
FIG. 2 shows the arrangement of spacers 30, 31 on the substrates 11 and 12 respectively. The size and number of the spacers shown in this and subsequent figures is for illustrative purposes only and does not represent the actual size and number of spacers.
Figure 3A:
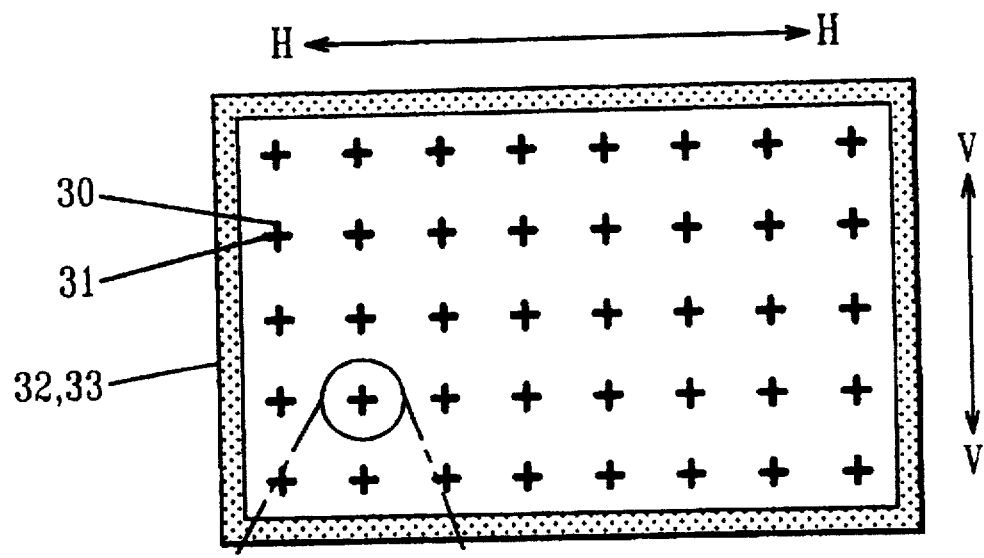
FIG. 3A shows how the spacers 30, 31 overlap when the cell is assembled.

In the case of bistable liquid crystal effects, such as PSCT, an active matrix may not be required. Consequently, 16 will be etched into column strips and 17 will be etched into row strips, in a direction, orthogonal to 16. The nematic guest-host effect will be used as an example in the remainder of this description. This effect is suitable for being addressed with an active matrix and the electrodes 17 will be formed from a highly reflective metal such as, for example, Aluminum. Alternatively, they could be made from a dielectric mirror stack coated with a transparent conducting material. Referring now to FIG. 2, spacers 30, 31 are deposited on to substrates 11 and 12. The spacers are precisely located so that, when substrates 11 and 12 are brought together, pairs of spacers on opposite substrates overlap as shown in FIG. 3. There are several methods for depositing such spacers know in the art. A preferred method is to coat the substrate with a polymer such as polyimide, with a thickness substantially equal to the required spacer height. The film is then cured, patterned by photolithographic means and etched by a reactive ion etching process to leave the required spacers. The dimensions of the spacers will be determined by the liquid crystal effect used, the pixel pitch and the precision of the tooling used to align the substrates during cell assembly. In this example, their shape and size has been chosen so that, simultaneously, the alignment accuracy of 11 to 12 is minimized and the spacers remain sufficiently narrow in width to be hidden in the interpixel gaps. However, this invention is not restricted to the particular size and shape shown, and any suitable alternative size and shape may be used. Typical values in the present case will be height between 3 and 10 μm, length between 20 and 250 μm and width less than the interpixel gap (5-20 μm). There is an advantage in positioning the spacers in the interpixel gap since they do not then interfere with or degrade the visual performance of the display. The substrates are then spin-coated with a thin layer (a few tens of nanometers thick) of an aligning polymer such as polyimide, cured and rubbed, preferably in the direction of the long axis of the spacers.

Figure 4:
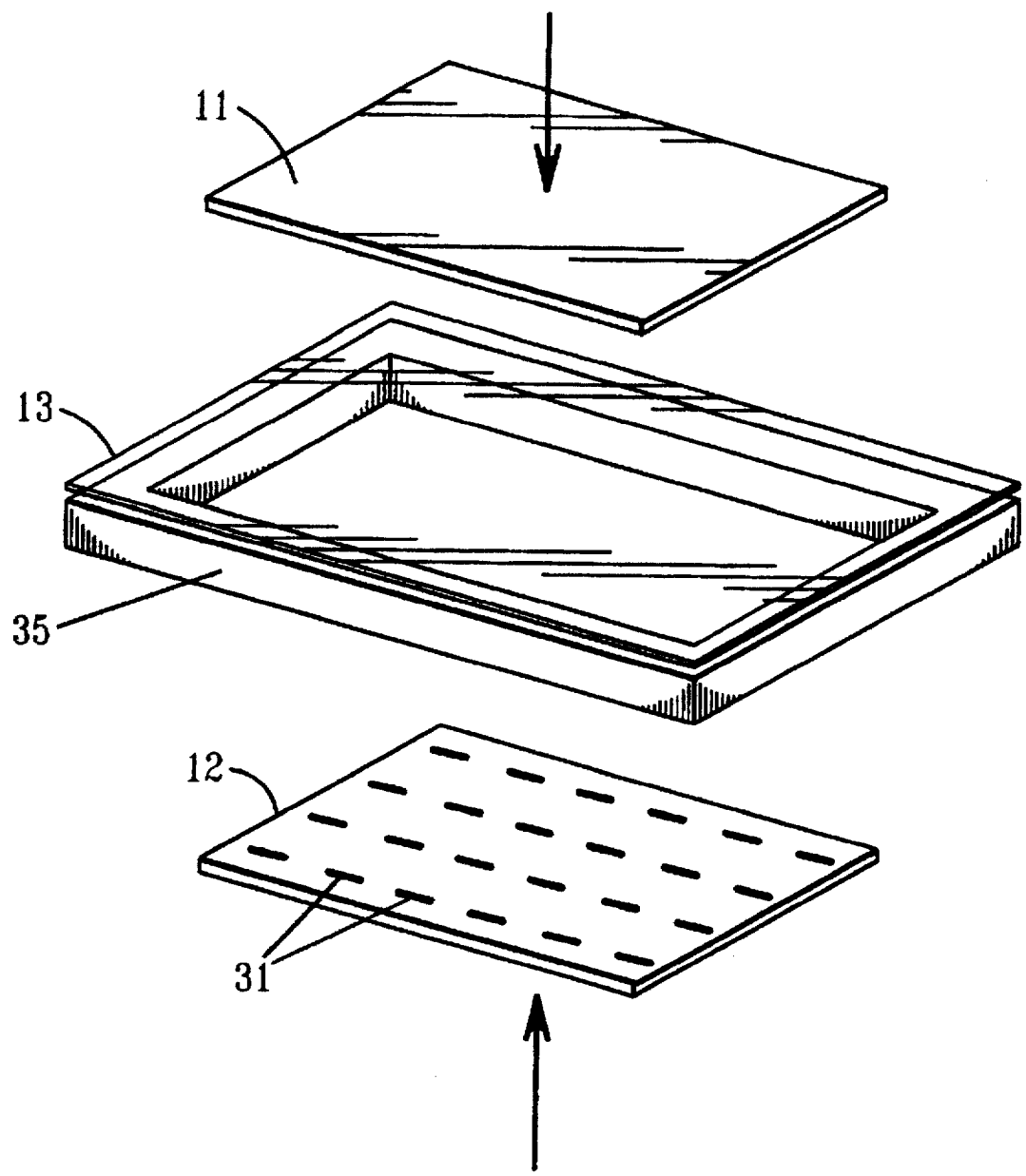
FIG. 4 shows the intermediate substrate 13 mounted on a supporting frame 35 which enables the film to be handled and kept flat, with its surfaces out of contact with solid objects 13 may be fixed to 35 with adhesive or mechanically clamped or held by any other suitable means under suitable, uniform tension. During cell assembly, the upper and lower substrates 11,12 are aligned with respect to each other with 13 in place between them. By suitable mechanical means they are then moved into contact as shown by the arrows and the cell is sealed by curing the peripheral adhesive.

The intermediate substrate is a polymer film which must be as thin as possible, consistent with handling and processing requirements. A preferred example is Mylar (™), a polyester film manufactured by DuPont, which is available in thickness down to 0.9 μm, but any film with the required optical and mechanical properties will be suitable. Other polymer films such as, but not limited to, polyimide, polyamide and polyacrylates, and ultra thin glass, oxide or other transparent dielectric films would also be suitable within the handling and processing constraints already mentioned. Mylar will be used as the preferred material in this description. Referring now to FIG. 4, a sheet of Mylar 13 is attached to a rigid, flat frame 35 either by adhesive or mechanical means such that it is held under light, uniform tension. The film so mounted is then subjected to a heating cycle up to about 200 degrees Centigrade. This causes a permanent shrinkage of the film to occur which tensions and flattens it. Mylar film is optically anisotropic, and for the present example, it is important that the liquid crystal is aligned either parallel to or perpendicular to the optic axis. The axial direction is determined by some suitable method such as examining the film between crossed polarizing prisms although in practice, in manufacture when the film is cut from a bulk roll, the direction of the optical axis will be substantially constant and will not need to be determined for every sample. Then the film is subjected to an alignment process. Any process consistent with the handling properties of the film can be used. Non-contact methods are to be preferred but contact methods are not excluded. An example of a non-contact method is to spin-coat both sides of the film with a thin polyimide aligning layer and then expose each surface to collimated UV radiation at the appropriate direction to produce orthogonal alignment directions on the two surfaces of 13.

However, a preferred method, which avoids both the need to pre-coat the film 13 with an alignment layer and the need for rubbing contact, is to expose each side of the film to a beam of low energy ions, such as Argon ions, at an incident angle between 45° and 85° with respect to the substrate normal, in such directions as to provide the required orthogonal alignment directions, parallel and perpendicular to the optic axis, on the two surfaces of 13. In order to carry this out a thin mylar sheet is stretched across a frame. The film is free-standing. The mylar is irradiated directly. Note no polyimide is spun on the mylar. Thus, we protect the use of mylar, a free-standing film, a frame, and its use in a display. Such methods are described in U.S. patent application Ser. No. 08/664,884 filed on the same day herewith entitled, "Atomic Beam Alignment of Liquid Crystals" to Chaudhari et al., which is assigned to the assignee of the present invention and is incorporated herein by reference.

Referring now to FIG. 2, adhesive 32,33 is deposited around the periphery of substrates 11 and 12. In practice a gap is left in the adhesive to form an opening through which the cell can subsequently be filled. Substrate 12 is placed in an alignment tool. The film 13, still attached to the frame 35 is lowered over 12. Substrate 11 is then positioned so that the spacers 30, 31 overlap as shown in FIG. 3. It is then lowered and forced into contact with 13 and 12 and the adhesive is cured. The Mylar film 13 is now held in tension by the peripheral adhesive seal, and the cell spacing is maintained to the required degree of precision because the film is clamped between spacers at each spacer intersection. The density of spacers can be adjusted to ensure that this requirement is met. Excess Mylar is trimmed from around the periphery of the cell and the cell is now filled with a nematic guest-host mixture. Because the same mixture is used in both compartments 14,15 of the cell, the fill holes in the periphery can be adjacent. In other examples, when a different liquid crystal mixture is used in each compartment, the fill holes must be well separated, preferably on opposite sides of the display. The cell is held under excess external pressure to ensure that positive contact occurs at spacer intersection at all points on the display, and the fill holes are sealed with adhesive or some other suitable material.

The configuration of the cell is such that, in the field-off state, compartment 14 contains an untwisted homogeneously aligned nematic guest-host layer which will efficiently absorb light polarized in the direction of the arrow H—H in FIG. 3. Compartment 15 contains a similar nematic guest-host layer, but with the alignment direction orthogonal to that in compartment 14. This layer efficiently absorbs light polarized in the direction of the arrow V—V. Thus the cell effectively absorbs all the light incident on it. When a field is applied across the cell between substrates 11 and 12, the liquid crystal molecules, which have positive dielectric anisotropy, rotate substantially perpendicular to the plane of the display. In this orientation absorption of the incident light by the dye molecules is minimized and the display becomes highly reflective. This display demonstrates the very low field-off state reflectivity and low drive voltage of the known art of Example 1 and the high field-on state reflectivity of the know art in Example 2. Because of the very thin intermediate substrate 13 used, there is effectively no parallax between the images formed in the upper and lower compartments of the cell. Better that 12:1 contrast is obtainable with an on-state reflectivity in excess of 60%.

This embodiment relates to the use of thematic materials with positive dielectric anisotropy, which align with the molecules parallel to the direction of an applied electric field.

Another embodiment of the stacked guest-host effect relates to the use of nematic materials with negative dielectric anisotropy, which align with the molecules perpendicular to the direction of an applied electric field.

Figure 3B:
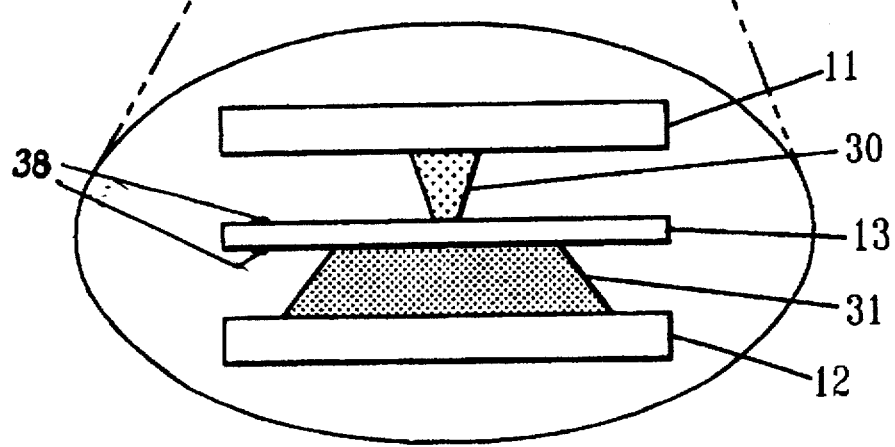
FIG. 3B shows in detail a section through the cell at a point where the intermediate substrate 13 effectively clamped in position at the intersection point of the spacers 30 and 31.

The general cell construction and properties for this embodiment are substantially the same as for the first described embodiment. What is different is that the alignment layers 18 in FIG. 1A are such as to cause substantially homeotropic (perpendicular) alignment of the liquid crystal molecules in compartment 14, with a small tilt bias in the direction of the arrow H—H in FIG. 3A. In similar fashion, the alignment layers 19 in FIG. 1A are such as to cause substantially homeotropic alignment of the liquid crystal molecules in compartment 15 but with a small tilt bias in the direction of the arrow V—V in FIG. 3A. Thus the field-off state of the display is light. When an electric field is applied between substrates 11 and 12, the liquid crystal molecules align substantially parallel to the substrates and parallel to the direction H—H in compartment 14 and parallel to V—V in compartment 15. Thus the field-on state of this embodiment is dark. The methods of producing homeotropic alignment with a tilt bias are known in the art and are not claimed here. The reflectivity and contrast ratio achievable by this embodiment are substantially the same as that achievable in the first embodiment, but this embodiment is light in the field-off state as opposed to dark in the case of the first preferred embodiment. FIG. 3B also illustrates an embodiment wherein electrodes 38 are placed on one or both surfaces of the thin transparent membrane.

Another embodiment of this invention relates to effects in which the liquid crystal layer itself reflects light as discussed in example 3 of the prior art. Here the cell structure is substantially the same as that in the first preferred embodiment. However, the properties required of the intermediate substrate 13 are different in this case. Compartments 14 and 15 are filled with chiral nematic materials with opposite twist senses, e.g., a right-handed twist layer in 14 and a left-handed twist layer in 15. Thus the light which is transmitted by 14 will be left circularly polarized, and this polarization state must be preserved as it is the state which is reflected by the material in 15. Thus 13 must be substantially optically isotropic. In other words, it must have substantially zero birefringence. In the case of Mylar films, this will be difficult to achieve with a single film. However, two substantially identical birefringent films oriented orthogonally to each other will achieve the required optical properties since the birefringence in the one film will be cancelled by the other. A suitable composite film can be made by simply bringing together two such films by evacuating the space between them. They will then remain in intimate contact by the action of surface forces. Alternatively, a film which is substantially isotropic in the plane of the film can be made by casting or spin coating a polymer material and subsequently curing it and removing it from the substrate, which could be solid or liquid. The cell is processed in substantially the same manner as in the first preferred embodiment, with the fill holes for the two compartments separated and the compartments filled separately with the left-handed and right-handed materials. It should be noted that the alignment requirements may differ, according to the nature of the effect used, but these are already described in the prior art. A cell such as the one described here will exhibit approximately double the reflectivity of the cells described in the prior art.

Another embodiment of the invention relates also to the use of effects in which the liquid crystal layer reflects light. Here, the birefringence of the intermediate substrate 13 is exploited by adjusting its optical anisotropy such that the optical path lengths parallel to and perpendicular to its optic axis differ by one half wavelength of light. In this case, compartments 14 and 15 are filled with the same chiral nematic material. We will use right-handed material as the example, but the argument applies equally to left-handed material. The left circular polarized light transmitted by 14 now becomes converted to right circular polarized light on transmission through 13 and is now reflected by 15. Because it will be difficult to make a film which is exactly a half-wave retarder throughout the visible region of the spectrum, the performance of this example may be inferior to that in the preceding example.

Figure 5A:
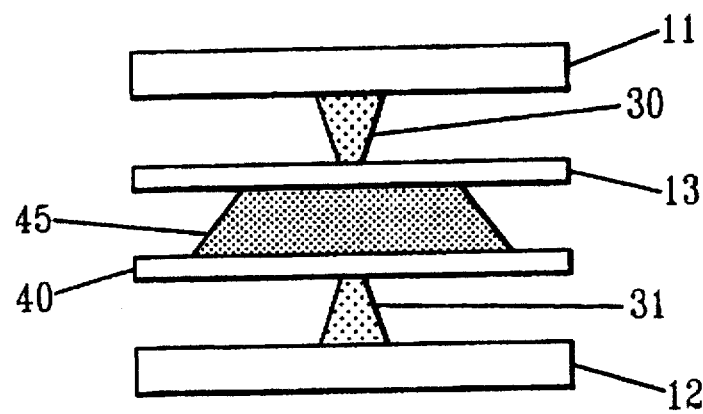
FIG. 5A shows a detailed cross-sectional view of the spacer overlap region of a three compartment cell comprising a front substrate 11, a rear substrate 12 and two intermediate substrates 13 and 40. Spacers 30, 31 and 45 are deposited on to substrates 11, 12 and 40 respectively.

Yet another embodiment of this invention involves displays which require more than two compartments. For example, application of this invention to a stacked color cell similar to that described by Crooker et al in U.S. Pat. No. 5,200,845 would require a total of six compartments. However, the principle involved is similar for any number of compartments greater than two. In such cases, spacers must be deposited on to the appropriate number of surfaces of the intermediate substrates. Referring now to FIG. 5A, a three compartment cell is made by using an additional intermediate substrate 40 on to which must be processed spacers 45.

Note that in this configuration, spacers 31 deposited on to substrate 12 are now rotated to a direction perpendicular to the case for a two compartment cell.

Figure 5B:
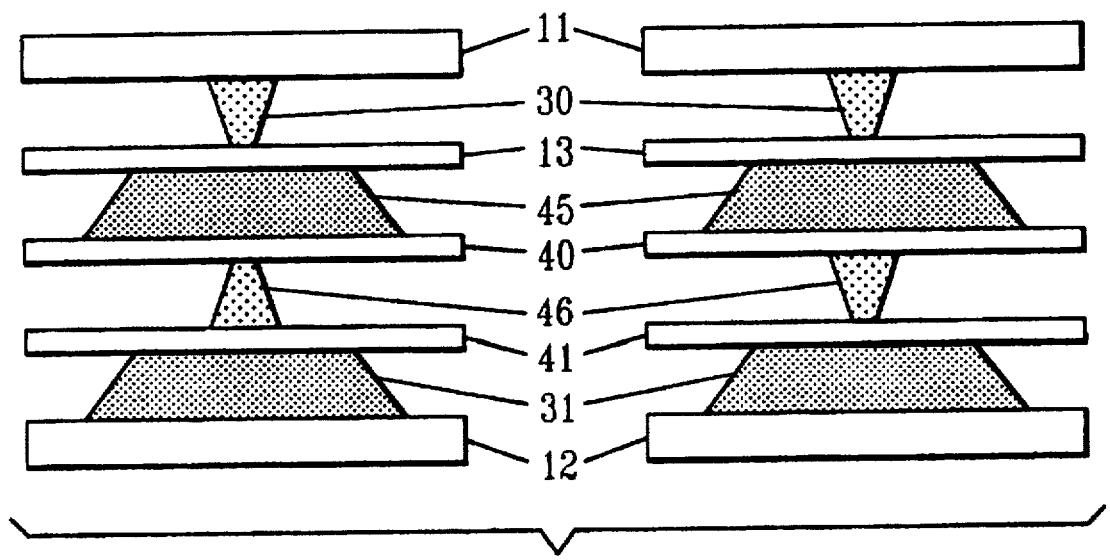
FIG. 5B shows a detailed cross-sectional view of the spacer overlap region of a four compartment cell comprising a front substrate 11, a rear substrate 12 and three intermediate substrates 13, 40 and 41. Spacers 30, 31 are deposited on to substrates 11 and 12 respectively. Also shown are two alternative configurations for the deposition of spacers 45, 46. In the left hand illustration of FIG. 5B, spacers 45 and 46 are deposited on to substrates 40 and 41 respectively. In the right hand illustration, spacers 45, 46 are deposited on to opposite sides of substrate 40.

FIG. 5B shows a four compartment cell. Here there are two options for the deposition of spacers on to the intermediate substrates 40, 41. Either one set of spacers can be deposited on each (spacers 45, 46 on to substrates 40, 41 respectively) (left hand illustration) or both sets of spacers 45, 46 can be processed on to substrate 40 (right hand illustration). The former procedure will be simpler from the processing standpoint, but the latter will allow for simpler cell assembly as the number of substrates which must be precisely aligned is reduced from four to three.

While the present invention has been described with respect to preferred embodiments, numerous modifications, changes, and improvements will occur to those skilled in the art without departing from the spirit and scope of the invention.

I claim:

1. A liquid crystal display cell exhibiting liquid crystal effect comprising:

at least two compartments, each separated by means of a thin transparent membrane held in tension by at least one peripheral adhesive seal, and maintained in precise spatial separation by means of accurately positioned spacers and in which the membrane is substantially thinner than the thickness of each of said compartments, such that no parallax exists between the images formed in the separate compartments; and liquid crystal material disposed in said compartments.

2. A cell according to claim 1, wherein said liquid crystal effect is monostable and is driven via an active matrix.

3. A cell according to claim 2 wherein said cell comprises two compartments and wherein said liquid crystal material comprises two orthogonal homogeneously aligned nematic guest-host layers.

4. A cell according to claim 3 in which said two homogeneously aligned nematic guest-host layers on the thin transparent membrane are respectively arranged parallel and perpendicular to the in-plane optic axis of the membrane.

5. A cell according to claim 1 in which the liquid crystal effect is bi-stable and is driven by a passive matrix.

6. A cell according to claim 5 in which the thin transparent membrane is substantially optically isotropic.

7. A cell according to claim 5 in which the thin transparent membrane is optically anisotropic.

8. A cell according to claim 1 in which the thin transparent membrane is an organic polymeric material.

9. A cell according to claim 1 in which the thin transparent membrane is an inorganic dielectric material.

10. A cell according to claim 1 in which the display is a reflective liquid crystal display.

11. A cell according to claim 1 in which the display is a transmissive liquid crystal display.

12. A cell according to claim 1 in which the thin transparent membrane has electrodes deposited on to either or both of its surfaces.

13. A cell according to claim 1 in which the liquid crystal effect is bi-stable and is driven by an active matrix.

14. A cell according to claim 1 in which the liquid crystal effect is multi-stable and is driven by an active matrix.

15. A cell according to claim 1 in which the liquid crystal effect is multi-stable and is driven by a passive matrix.

16. A liquid crystal display cell exhibiting liquid crystal effect comprising:

at least two compartments, each separated by means of a substantially optically isotropic thin transparent membrane held in tension by at least one peripheral adhesive seal, and maintained in precise spatial separation by means of accurately positioned spacers and in which the membrane is substantially thinner than the thickness of each of said compartments, such that no parallax exists between the images formed in the separate compartments; and liquid crystal material disposed in said compartments comprising two layers of chiral nematic material of opposite twist sense, wherein the pitch of said chiral nematic material results in reflection of the required region of the electromagnetic spectrum used as the display medium.

17. A liquid crystal display cell exhibiting liquid crystal effect comprising:

at least two compartments, each separated by means of an optically anisotropic thin transparent membrane comprising a half wave retarder at the optical wavelength used, held in tension by at least one peripheral adhesive seal, and maintained in precise spatial separation by means of accurately positioned spacers, and in which the membrane is substantially thinner than the thickness of each of said compartments, such that no parallax exists between the images formed in the separate compartments; and liquid crystal material disposed in said compartments comprising at least two layers of chiral nematic material of the same twist sense.

18. A structure comprising:

a first substrate;

a second substrate;

a third substrate comprising at least one thin transparent membrane held in tension between said first and second substrates; forming a first space between said first and third substrates and a second space between said third and second substrates and wherein the thickness of said transparent membrane is substantially less than the thickness of each of said spaces; and a liquid crystal material disposed in said first space and said second space.

19. A structure according to claim 18, wherein said third substrate is optically transparent and wherein at least one of said first and second substrates are optically transparent.

20. A structure according to claim 18, wherein said first space has a first thickness, said second space has a second thickness, said third substrate has a third thickness, and said third thickness is substantially less than said first and said second thicknesses.

21. A structure according to claim 18, wherein said liquid crystal material in said first space has a first alignment and said liquid crystal in said second space has a second alignment.

22. A structure according to claim 21, wherein said first and said second alignments are orthogonal.

23. A structure according to claim 18, wherein said third substrate has a first side with a first alignment layer thereon and a second side with a second alignment layer thereon.

24. A structure according to claim 18, wherein said membrane is formed from a polymeric material.

25. A structure according to claim 18, wherein said third substrate is optically anisotropic.

26. A structure according to claim 18, wherein said third substrate comprises an inorganic dielectric material.

27. A structure according to claim 18, wherein said third substrate has electrodes on at least one side thereof.

28. A structure comprising:

a first substrate;

a second substrate;

a third substrate comprising at least one thin transparent membrane disposed in tension between said first and second substrates; forming a first space between said first and third substrates and a second space between said third and second substrates, and wherein the thickness of said transparent membrane is substantially less than the thickness of each of said spaces; and a liquid crystal material disposed in said first space and said second space, wherein said liquid crystal material in said first and second spaces comprises first and second chiral nematic materials having opposite twist senses.

29. A structure comprising:

a first substrate;

a second substrate;

a third substrate comprising at least one thin transparent membrane disposed in tension between said first and second substrates; forming a first space between said first and third substrates and a second space between said third and second substrates and wherein the thickness of said third substrate is substantially less than the thickness of said spaces, wherein said third substrate comprises a halfwave retarder; and a liquid crystal material disposed in said first space and said second space.

30. A structure comprising:

a first and second substantially planar substrates;

wherein said first substrate is disposed adjacent to and substantially parallel to and spaced apart from said second substrate;

a thin transparent film disposed in tension between said first and second substrate;

a plurality of first spacers forming a first space between said thin transparent film and said first substrate and a plurality of second spacers between said thin transparent film and said second substrate to form a second space and wherein the thickness of said thin transparent film is substantially thinner than the thickness of said first and said second spaces; and liquid crystal material disposed in said first space and said second space, and wherein said plurality of first spacers are substantially oriented in alignment with said plurality of second spacers;

said thin transparent film has a first surface facing said first space and a second surface facing said second space; and said first surface is adapted to align said liquid crystal material in a first direction with respect to the plane of said substrates and said second surface is adapted to align said liquid crystal material in said second space in a second direction with respect to the plane of said substrates.

* * * * *